US 8,054,725 B2

(12) United States Patent
Nagara et al.

(10) Patent No.: US 8,054,725 B2
(45) Date of Patent: Nov. 8, 2011

(54) OPTICAL DISK APPARATUS

(75) Inventors: Toru Nagara, Tokyo (JP); Yoshio Fukutomi, Chiba (JP)

(73) Assignee: Sony Corporation, Tokyo (JP)

( * ) Notice: Subject to any disclaimer, the term of this patent is extended or adjusted under 35 U.S.C. 154(b) by 2154 days.

(21) Appl. No.: 10/964,625

(22) Filed: Oct. 15, 2004

(65) Prior Publication Data

US 2005/0111340 A1 May 26, 2005

(30) Foreign Application Priority Data

Oct. 30, 2003 (JP) ............................... P2003-371085

(51) Int. Cl.
*G11B 7/00* (2006.01)
(52) U.S. Cl. ............... 369/59.21; 369/44.34; 369/44.37; 369/124.05; 369/116
(58) Field of Classification Search ............ 369/124.05, 369/59.21, 116, 44.34, 44.37
See application file for complete search history.

(56) References Cited

U.S. PATENT DOCUMENTS

| | | | | | |
|---|---|---|---|---|---|
| 4,855,983 | A * | 8/1989 | Arai | ............................ | 369/44.34 |
| 4,935,915 | A * | 6/1990 | Fujiwara et al. | ............... | 369/116 |
| 6,594,210 | B2 * | 7/2003 | Kumagai | .................... | 369/47.17 |
| 6,961,294 | B2 * | 11/2005 | Matsui | ........................ | 369/53.27 |
| 2002/0097991 | A1 * | 7/2002 | Tanaka | ........................... | 386/126 |
| 2002/0101806 | A1 * | 8/2002 | Miyaki | ........................ | 369/47.53 |
| 2002/0141313 | A1 * | 10/2002 | Chuang | ........................ | 369/53.26 |
| 2002/0154583 | A1 * | 10/2002 | Mashimo | .................... | 369/44.29 |
| 2003/0112732 | A1 * | 6/2003 | Masui et al. | ................. | 369/59.12 |
| 2004/0004916 | A1 * | 1/2004 | Nadershahi | .................. | 369/47.5 |
| 2005/0041562 | A1 * | 2/2005 | Yang et al. | .................... | 369/116 |
| 2005/0083828 | A1 * | 4/2005 | Chen | ............................ | 369/116 |

FOREIGN PATENT DOCUMENTS

| | | |
|---|---|---|
| EP | 1 136 992 A2 | 9/2001 |
| JP | 11-053753 | 2/1999 |
| JP | 11-144288 | 5/1999 |
| JP | 2001-196687 | 7/2001 |
| JP | 2002-100044 | 4/2002 |
| JP | 2002-109739 | 4/2002 |
| JP | 2002-299544 | 10/2002 |
| JP | 2002-352453 | 12/2002 |

(Continued)

OTHER PUBLICATIONS

Japanese Office Action: Application No. 2003-371085; Dated: May 10, 2007.
Sony: "Optical Pickup Chipset with CD/DVD Recording Photodetector IC (PDIC) Supports High-Speed Writing to both CD and DVD Media", Datasheet CXA2677GA and CXA2676GA, [Online] May 2003 (Feb. 3, 2005), XP002421609.
European Search Report; Application No./Patent No. 04024985.6-1232; Dated Mar. 21, 2007.

*Primary Examiner* — Wayne Young
*Assistant Examiner* — Dionne Pendleton
(74) *Attorney, Agent, or Firm* — Rader, Fishman & Grauer PLLC (57) ABSTRACT

An optical disk apparatus for writing signals on a recording medium by irradiating the recording medium with a laser beam modulated based on the signals includes a first converting unit for converting a first reflected laser beam component from the recording medium into electrical signals; a second converting unit for converting a second reflected laser beam component into electrical signals; a first sample-and-hold unit for sampling and holding the electrical signals from the first converting unit; a second sample-and-hold unit for sampling and holding the electrical signals from the second converting unit; and transmitting devices for transmitting the held signals from the first and the second sample-and-hold units. The sampled signals are averaged, and the averaged signal is held in each of the first and the second sample-and-hold units during signal writing.

11 Claims, 5 Drawing Sheets

FOREIGN PATENT DOCUMENTS

| | | |
|---|---|---|
| JP | 2003-178481 | 6/2003 |
| JP | 2003-228870 | 8/2003 |
| JP | 2004-199818 | 7/2004 |
| WO | WO-2004-081921 A2 | 9/2004 |

* cited by examiner

OPTICAL DISK APPARATUS

BACKGROUND OF THE INVENTION

1. Field of the Invention

The present invention relates to optical disk apparatuses that can write to optical disks, i.e., recording media, including Compact Disk Recordable (CD-R) and Digital Versatile Disc Recordable (DVD-R), and in particular, relates to an optical disk apparatus that is designed to shorten the settling time when laser power changes from that for a write mode to that for a bias mode.

2. Description of the Related Art

As disclosed in page 5 and FIG. 1 of Japanese Unexamined Patent Application Publication No. 11-53753, in known CD-R drives and DVD-R drives, photoelectrically converted signals corresponding to laser diode light reflected from a disk are output from a photodetector integrated circuit and a front-monitor photodetector integrated circuit which are built into an optical pickup. The photoelectrically converted signals have a shape shown in FIG. 8A and are generally transmitted to a radio-frequency (RF) signal-processing integrated circuit through flexible cables.

Figure 8A:
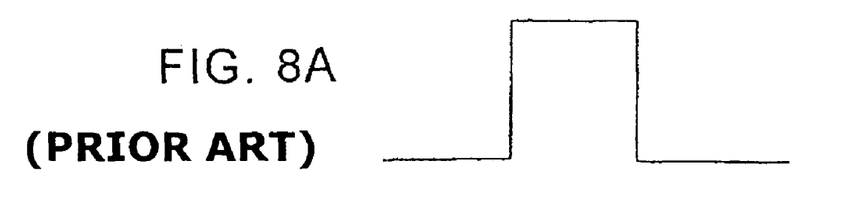
FIG. 8A is a graph illustrating signals before passing through flexible cables in the related art.

The RF-signal-processing integrated circuit outputs, for example, servo signals and automatic-power-control (APC) signals based on the photoelectrically converted signals input through the flexible cables. To output servo signals, sampling the photoelectrically converted signals is required while the laser diode light is emitted at a bias laser power, i.e., while the photoelectrically converted signals are at a low level, as shown in FIG. 8A. When the recording speed increases, the sampling period shortens. Thus, the settling time of the photoelectrically converted signals needs to be shortened when the photoelectrically converted signals during a write period change to those during a bias period, i.e., while the photoelectrically converted signals are at a low level, as shown in FIG. 8A.

Figure 8B:
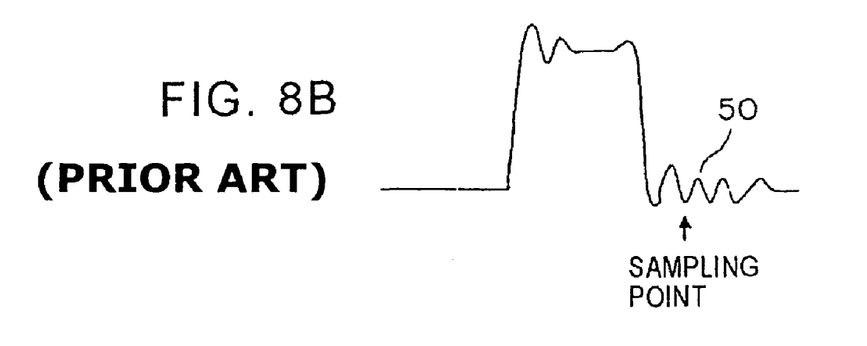
FIG. 8B is a graph illustrating signals after passing through flexible cables in the related art.

However, the above-described flexible cables electrically function as transmission lines, and possess frequency characteristics having peaks around 150 MHz. When the output slew rate of the front-monitor photodetector integrated circuit is enhanced to shorten the settling time in this situation, ringing 50 occurring in the photoelectrically converted signals is increased during the bias period, i.e., the period when the photoelectrically converted signals are at a low level (FIG. 8B). Thus, the settling time does not get shorter, but rather gets longer.

Since increasing the slew rate means that the load capacitance of, for example, capacitance components of the flexible cables and the input capacitance of the downstream RF-signal-processing integrated circuit must be charged for a short time, a large circuit current must run through the tail ends of the photodetector integrated circuit and the front-monitor photodetector integrated circuit. Accordingly, power consumption increases and exceeds an allowable power consumption of the package. Thus, the settling time cannot be shortened by enhancing the slew rate. Consequently, it is quite difficult to shorten the settling time when the write laser power changes to the bias laser power to less than 10 ns. When the recording speed increases, precision in servo control decreases, and tracking servo may even fail.

Figure 9:
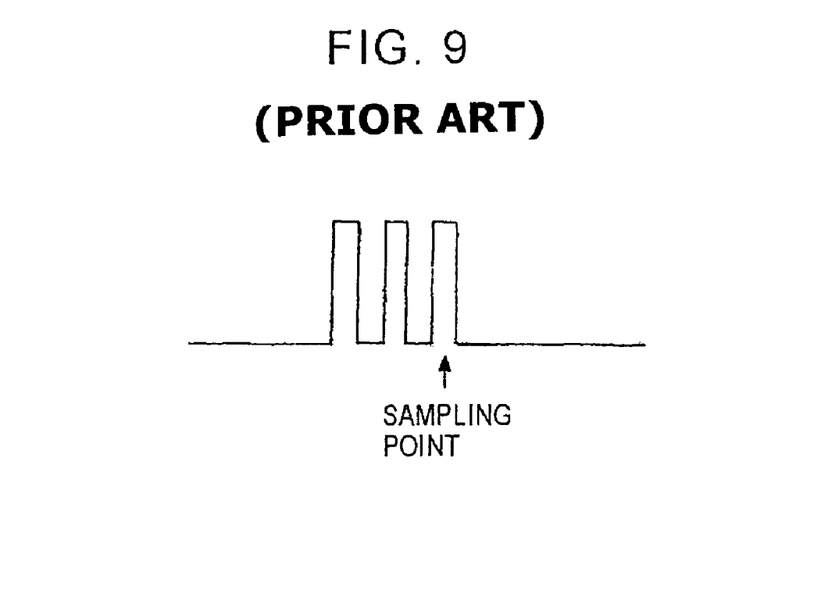
FIG. 9 is a graph illustrating a waveform of power monitor signals in pulse-train writing in the related art.

To solve the above problem, the photodetector integrated circuit and the front-monitor photodetector integrated circuit may be provided with sample-and-hold circuits for sampling and holding the photoelectrically converted signals to decrease the amplitude of the photoelectrically converted signals and to transmit these held signals. Such a decreased amplitude reduces ringing. On the other hand, rewritable media are written with a pulse train, and a plurality of quite short pulses occurs in the photoelectrically converted signals during the write period, as shown in FIG. 9. High level portions of these pulses are sampled to determine an optimum laser power by optimum power control (OPC) and to read out an absolute address. When the recording speed increases, the sampling timing shifts, thereby encountering difficulties in sampling the high level portions of the pulses. Sampling output is unstable, and thus OPC is unstable. Moreover, it is increasingly difficult to read out an accurate address, and thus the writing operation is unstable.

As described above, the sampled and held signals are preferably transmitted from the photodetector integrated circuit and the front-monitor photodetector integrated circuit to the RF-signal-processing integrated circuit which is located downstream. However, one type of RF-signal-processing integrated circuit can receive sampling output while another type can receive only differential output, these types having various kinds of interface. Thus, the versatility of the photodetector integrated circuit and the front-monitor photodetector integrated circuit which output the sampled and held signals is limited.

SUMMARY OF THE INVENTION

The present invention is intended to address the above problems. It is an object of the present invention to provide an optical disk apparatus which transmits signals, without distortion in a signal waveform, corresponding to laser beam components reflected from a disk through flexible cables from a photodetector integrated circuit and a front-monitor photodetector integrated circuit to an RF-signal-processing integrated circuit without an increase in power consumption even at an increased recording speed, so that various kinds of signal processing can be carried out precisely and stably. It is another object of the present invention to provide an optical disk apparatus which enables precise and stable signal sampling for smooth data writing when a pulse-train write technique is used and when the signals, for a write period, corresponding to laser beam components reflected from a disk are sampled in the photodetector integrated circuit and the front-monitor photodetector integrated circuit. It is another object of the present invention to provide an optical disk apparatus which improves the versatility of the photodetector integrated circuit and the front-monitor photodetector integrated circuit which output sampled signals.

According to a first aspect of the present invention, an optical disk apparatus for writing signals on a recording medium by irradiating the recording medium with a laser beam modulated based on the signals includes a first converting unit for converting a first reflected laser beam component obtained by irradiating the recording medium with the laser beam into electrical signals; a second converting unit for converting a part of a second reflected laser beam component into electrical signals; a first sample-and-hold unit for sampling and holding the electrical signals obtained by the first converting unit; a second sample-and-hold unit for sampling and holding the electrical signals obtained by the second converting unit; and transmitting devices for transmitting the held signals obtained by the first and the second sample-and-hold units to a signal-processing unit at the next stage. The first sample-and-hold unit includes a first sample-and-hold circuit for a write mode for sampling and averaging the electrical signals, and for holding the averaged signal while the laser beam is emitted at a write laser power, and a second sample-and-hold circuit for a bias mode for sampling and holding the electrical signals while the laser beam is emitted at a bias laser power. The second sample-and-hold unit includes a third sample-and-hold circuit for a write mode for sampling and averaging the electrical signals, and for holding the averaged signal while the laser beam is emitted at a write laser power, and a fourth sample-and-hold circuit for a bias mode for sampling and holding the electrical signals while the laser beam is emitted at a bias laser power.

When data is written on a rewritable medium with a pulse-train write technique at a high recording speed, the cycle of pulses output from the first and the second converting units is quite short while the laser beam is emitted at a write laser power. In the optical disk apparatus according to the first aspect of the present invention, the first and the third sample-and-hold circuits in, for example, a photodetector integrated circuit and a front-monitor photodetector integrated circuit, sample and average the electrical signals, and hold the averaged signal while the laser beam is emitted at a write laser power. Accordingly, precise held signals without sampling timing shift can be transmitted to the signal-processing unit at the next stage, and precise and stable signal processing can be achieved in the signal-processing unit at the next stage. Thus, stable signal recording on a rewritable recording medium with a pulse-train write technique at a high speed can be achieved.

According to a second aspect of the present invention, an optical disk apparatus for writing signals on a recording medium by irradiating the recording medium with a laser beam modulated based on the signals includes a first converting unit for converting a first reflected laser beam component obtained by irradiating the recording medium with the laser beam into electrical signals; a second converting unit for converting a part of a second reflected laser beam component into electrical signals; a first sample-and-hold unit for sampling and holding the electrical signals obtained by the first converting unit; a second sample-and-hold unit for sampling and holding the electrical signals obtained by the second converting unit; and transmitting devices for transmitting the held signals obtained by the first and the second sample-and-hold units to a signal-processing unit at the next stage.

In the optical disk apparatus according to the second aspect of the present invention, the first sample-and-hold unit in, for example, a photodetector integrated circuit samples and holds the electrical signals corresponding to the first reflected laser beam component from a recording medium to decrease the amplitude of the held signals and to transmit these held signals with a small amplitude to the signal-processing unit at the next stage through the transmitting devices, for example, flexible cables. Thus, even when the flexible cables are used as the transmitting devices, the electrical signals corresponding to the first reflected laser beam component can correctly be transmitted to the signal-processing unit at the next stage. Moreover, the flexible cables are not driven during sampling of the signals. Accordingly, the settling time when a write laser power changes to a bias laser power during sampling of the signals in the photodetector integrated circuit can be sufficiently shortened by enhancing the slew rate during sampling of the signals. Even when the recording speed is increased, precise sampling can be achieved, and stable and precise held signals can be transmitted to the signal-processing unit without, for example, distortion in a signal waveform. Thus, various kinds of signal processing in the signal-processing unit can be stably and precisely carried out without an increase in power consumption, so that focus servo, tracking servo, and the like can be stably carried out to ensure a smooth data writing operation.

Simultaneously, the sampled signals with a reduced amplitude obtained by the second sample-and-hold unit in, for example, a front-monitor photodetector integrated circuit are transmitted to the signal-processing unit at the next stage through the transmitting devices, for example, flexible cables. Thus, even when the flexible cables are used as the transmitting devices, the electrical signals corresponding to the second reflected laser beam component can correctly be transmitted to the signal-processing unit at the next stage. Moreover, the flexible cables are not driven during sampling of the signals. Accordingly, the settling time when a write laser power changes to a bias laser power during sampling of the signals in the front-monitor photodetector integrated circuit can be sufficiently shortened by enhancing the slew rate during sampling of the signals. Even when the recording speed is increased, precise sampling can be achieved, and stable and precise held signals can be transmitted to the signal-processing unit. Thus, automatic power control of a laser beam, for example, can be stably and precisely carried out.

According to a third aspect of the present invention, an optical disk apparatus for writing signals on a recording medium by irradiating the recording medium with a laser beam modulated based on the signals includes a first converting unit for converting a first reflected laser beam component obtained by irradiating the recording medium with the laser beam into electrical signals; a second converting unit for converting a part of a second reflected laser beam component into electrical signals; a first sample-and-hold unit for sampling and holding the electrical signals obtained by the first converting unit; a second sample-and-hold unit for sampling and holding the electrical signals obtained by the second converting unit; first transmitting devices for transmitting the held signals obtained by the first and the second sample-and-hold units to a signal-processing unit at the next stage; and second transmitting devices for converting the electrical signals obtained by the first and the second converting units into differential signals and for transmitting the differential signals to the signal-processing unit at the next stage.

In the optical disk apparatus according to the third aspect of the present invention, each of a photodetector integrated circuit and a front-monitor photodetector integrated circuit includes the first transmitting devices for transmitting the held signals to a signal-processing unit at the next stage and the second transmitting devices for transmitting the differential signals to another signal-processing unit at the next stage. Thus, regardless of whether the type of input interface of the signal-processing unit at the next stage is the type for inputting the held signals or the type for inputting the differential signals, the photodetector integrated circuit and the front-monitor photodetector integrated circuit can be connected to the signal-processing unit at the next stage with, for example, flexible cables, and have improved versatility.

DESCRIPTION OF THE PREFERRED EMBODIMENTS

In an optical disk apparatus according to the present invention, electrical signals obtained by photoelectrically converting light reflected from a recording medium which is irradiated with a laser beam are sampled and held to be transmitted to a signal-processing circuit at the next stage. When the laser beam is emitted at a write laser power, electrical signals obtained by photoelectrically converting light reflected from a rewritable recording medium which is irradiated with a laser beam are sampled and held to be transmitted to a signal-processing circuit at the next stage. In addition, each of a photodetector integrated circuit and a front-monitor photodetector integrated circuit includes a first transmitting means for transmitting the held signals to a signal-processing circuit at the next stage and a second transmitting means for transmitting differential signals to another signal-processing circuit at the next stage. Thus, precise and stable signal recording on a rewritable medium at a high speed can be achieved due to precise and stable sampling without a sampling timing shift.

First Embodiment

Figure 1:
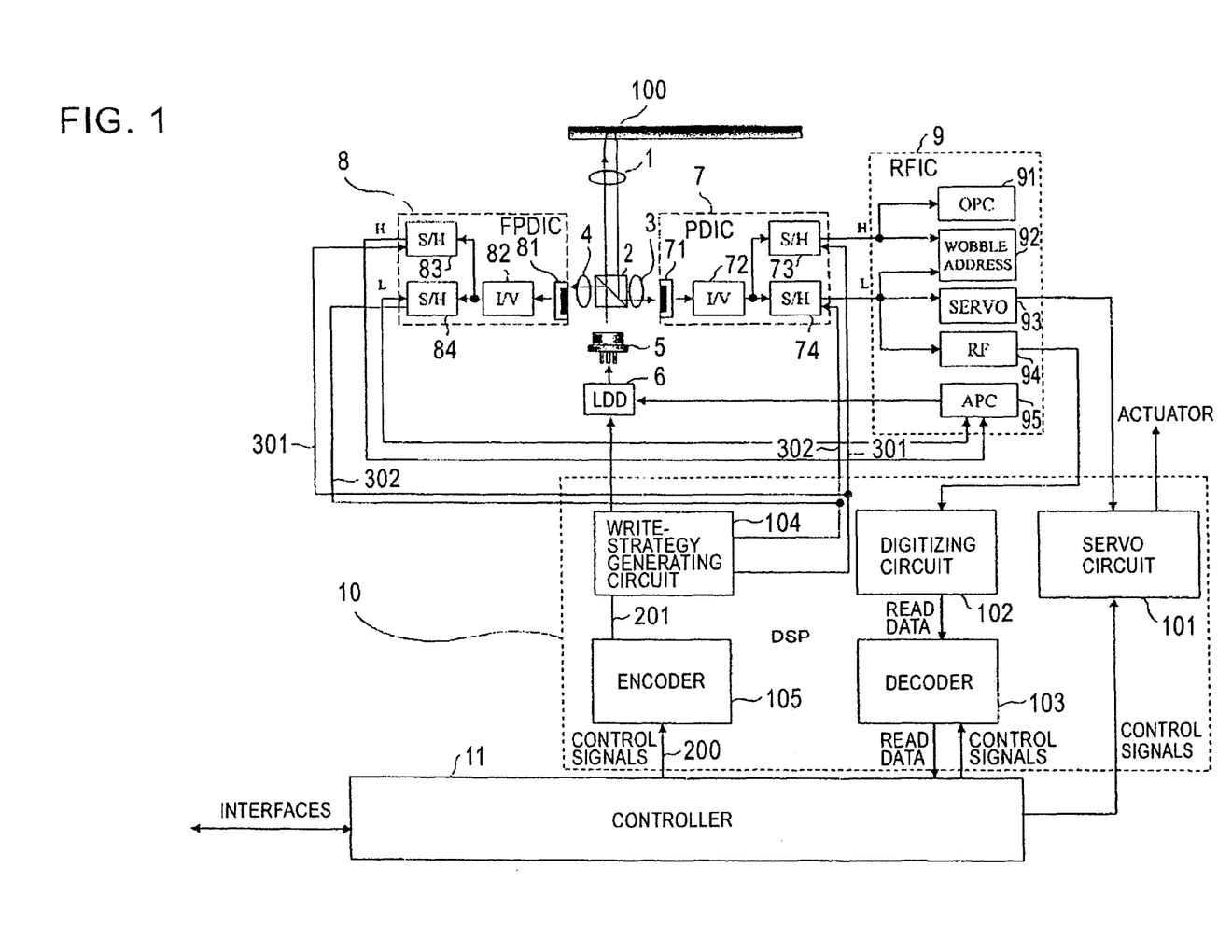
FIG. 1 is a block diagram illustrating the structure of an optical disk apparatus according to a first embodiment of the present invention.

FIG. 1 is a block diagram illustrating the structure of an optical disk apparatus according to a first embodiment of the present invention. The optical disk apparatus includes an objective lens 1, a beam splitter (BS) 2, converging lenses 3 and 4, a laser diode (LD) 5, a laser-diode driving circuit (LDD) 6, a photodetector integrated circuit (PDIC) 7, a front-monitor photodetector integrated circuit (FPDIC) 8, an RF-signal-processing integrated circuit (RFIC) 9, a digital signal processor (DSP) 10, and a controller 11.

The photodetector integrated circuit 7 includes a photodetector (PD) 71, a current-to-voltage converter (I/V) 72, and sample-and-hold circuits (S/H) 73 and 74. The front-monitor photodetector integrated circuit 8 includes a photodetector (PD) 81, a current-to-voltage converter (I/V) 82, and sample-and-hold circuits (S/H) 83 and 84. The RF-signal-processing integrated circuit 9 includes an optimum-power controlling circuit (OPC) 91, a wobble-address detecting circuit (WOBBLE ADDRESS) 92, a servo-signal generating circuit (SERVO) 93, an RF-signal generating circuit (RF) 94, and an automatic laser-emission power controlling circuit (APC) 95. The digital signal processor 10 includes a servo circuit 101, a digitizing circuit 102, a decoder 103, a write-strategy timing-generating circuit 104, and an encoder 105. Here, a recording medium of the present invention corresponds to an optical disk 100, signal-processing means corresponds to the RF-signal-processing integrated circuit 9, first converting means includes the photodetector 71 and the current-to-voltage converter 72, second converting means includes the photodetector 81 and the current-to-voltage converter 82, first sample-and-hold means includes the sample-and-hold circuits 73 and 74, second sample-and-hold means includes the sample-and-hold circuits 83 and 84, a first sample-and-hold circuit corresponds to the sample-and-hold circuit 73, a second sample-and-hold circuit corresponds to the sample-and-hold circuit 74, a third sample-and-hold circuit corresponds to the sample-and-hold circuit 83, a fourth sample-and-hold circuit corresponds to the sample-and-hold circuit 84, a first photoelectric conversion element corresponds to the photodetector 71, a second photoelectric conversion element corresponds to the photodetector 81, a first current-to-voltage converter corresponds to the current-to-voltage converter 72, and a second current-to-voltage converter corresponds to the current-to-voltage converter 82.

Figure 2A:
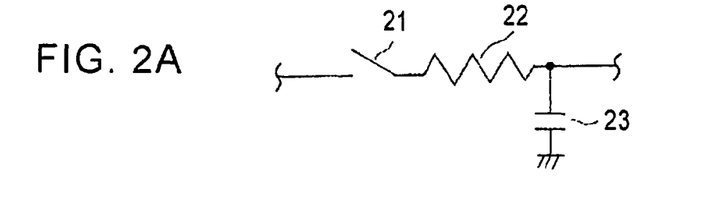
FIG. 2A is a circuit diagram illustrating the structure of each of the sample-and-hold circuits for a write mode shown in FIG. 1.
Figure 2B:
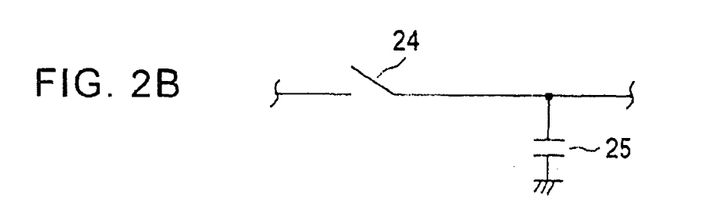
FIG. 2B is a circuit diagram illustrating the structure of each of the sample-and-hold circuits for a bias mode shown in FIG. 1.

FIG. 2A is a circuit diagram illustrating the structure of each of the sample-and-hold circuits 73 and 83, each of which includes a switch 21, a resistor 22, and a capacitor 23. The resistor 22 and the capacitor 23 form an integration circuit. FIG. 2B is a circuit diagram illustrating the structure of each of the sample-and-hold circuits 74 and 84, each of which includes a switch 24 and a capacitor 25.

The disk-writing operation in the first embodiment will now be described. The controller 11 outputs write data 200 to the encoder 105. The encoder 105 encodes the write data 200 into write data 201 and outputs the encoded write data 201 to the write-strategy timing-generating circuit 104. The write-strategy timing-generating circuit 104 generates write pulses according to the write data 201 and outputs the write pulses to the laser-diode driving circuit 6.

The laser-diode driving circuit 6 adjusts the laser power by superimposing the write pulses on output bias power, and this modulated laser beam is focused on the optical disk 100 through the beam splitter 2 and the objective lens 1 to write the data thereon. Simultaneously, the laser beam reflected from the optical disk 100 is split into two laser beam components by the beam splitter 2. A first laser beam component is input to the photodetector 71 in the photodetector integrated circuit 7, and a second laser beam component is input to the photodetector 81 in the front-monitor photodetector integrated circuit 8.

The photodetector 71 in the photodetector integrated circuit 7 receives the first laser beam component and converts it into a current. The current-to-voltage converter 72 converts this current into a voltage and outputs the voltage to the sample-and-hold circuits 73 and 74 as main signals. The sample-and-hold circuits 73 and 74 sample and hold the main signals, and transmit these signals to the RF-signal-processing integrated circuit 9 through flexible cables (not shown in the drawing).

In the same way, the photodetector 81 in the front-monitor photodetector integrated circuit 8 receives the second laser beam component and converts it into a current. The current-to-voltage converter 82 converts this current into a voltage and outputs the voltage to the sample-and-hold circuits 83 and 84 as power monitor signals. The sample-and-hold circuits 83 and 84 sample and hold the power monitor signals, and transmit these signals to the RF-signal-processing integrated circuit 9 through flexible cables (not shown in the drawing).

Figure 4:
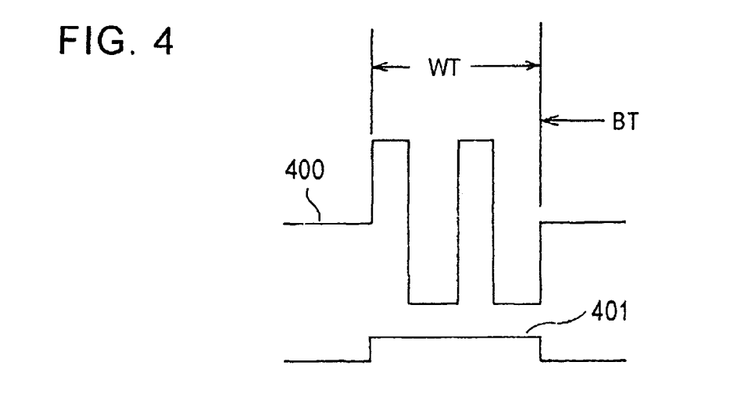
FIG. 4 illustrates an example of a signal waveform output from each of the current-to-voltage converters shown in FIG. 1 for a write period.

With reference to FIGS. 2A and 2B, the operation of each of the sample-and-hold circuits 73 and 74 used in the photodetector integrated circuit 7 will now be described. As shown in FIG. 2A, the switch 21 of the sample-and-hold circuit 73 is turned on for a write period WT shown in FIG. 4 and is turned off for a bias period BT shown in FIG. 4, according to sampled signals 301 generated by the write-strategy timing-generating circuit 104 in the digital signal processor 10. When a pulse-train write technique for writing on a rewritable medium is used, main signals 400 are minute repeating pulse signals for the write period WT. These pulse signals are averaged through the resistor 22 and the capacitor 23. The capacitor 23 holds the average signal level 401 of these minute pulse signals.

As shown in FIG. 2B, the switch 24 of the sample-and-hold circuit 74 is turned on for the bias period BT and is turned off for the write period WT, according to sampled signals 302 generated by the write-strategy timing-generating circuit 104 in the digital signal processor 10. Thus, the capacitor 25 holds a signal level of the main signals 400 for the bias period BT shown in FIG. 4.

The sample-and-hold circuit 83 used in the front-monitor photodetector integrated circuit 8 has the same structure as the sample-and-hold circuit 73 used in the photodetector integrated circuit 7, and holds an average signal level of the power monitor signals for a write period. The sample-and-hold circuit 84 has the same structure as the sample-and-hold circuit 74. The capacitor 25 holds a signal level of the power monitor signals for a bias period.

The signals held by the sample-and-hold circuit 73 in the photodetector integrated circuit 7 are transmitted to the OPC 91 and the wobble-address detecting circuit 92 in the RF-signal-processing integrated circuit 9 through the flexible cables. The signals held by the sample-and-hold circuit 74 are transmitted to the wobble-address detecting circuit 92, the servo-signal generating circuit 93, and the RF-signal generating circuit 94 through the flexible cables. Frequency characteristics and levels, for example, of read signals from the sample-and-hold circuit 74 are adjusted to generate RF signals.

The signals held by the sample-and-hold circuits 83 and 84 in the front-monitor photodetector integrated circuit 8 are transmitted to the APC 95 in the RF-signal-processing integrated circuit 9 through the flexible cables.

The OPC 91 in the RF-signal-processing integrated circuit 9 determines an optimum laser-emission power level of the laser diode 5 for recording based on the levels of the main signals for the write period, and sets the value of the optimum laser-emission power level in the APC 95. The APC 95 controls the laser-emission power level of the laser diode 5 so that the laser-emission power level is the above set value, based on the levels of the power monitor signals for the write period and the bias period.

The servo-signal generating circuit 93 outputs various kinds of servo signals to the servo circuit 101 in the digital signal processor 10 based on sampled signals of the main signals for the bias period. The servo circuit 101 generates servo signals for driving an actuator, not shown in the drawing, based on the input servo signals, and outputs them to the actuator. In this way, tracking control and focus control are carried out for an optical pickup which includes the photodetector integrated circuit 7, the front-monitor photodetector integrated circuit 8, and an optical system having the laser diode 5, the beam splitter 2, the objective lens 1, and the like.

The wobble-address detecting circuit 92 reads out an absolute address based on the sampled signals of the main signals for the write period and the bias period. The controller 11 always monitors a position on the optical disk 100 where data are being written, based on the read out absolute address. When the data are not being written at a predetermined position, the controller 11 controls the servo circuit 101 to rewrite the data. The controller 11 also controls on-off operations of the encoder 105, the decoder 103, and the servo circuit 101, and controls the overall operation of the apparatus. The controller 11 receives user requests input from interfaces, for example, an operation panel, not shown in the drawing, and operates the apparatus according to the user requests, and displays, for example, the state of the apparatus on the operation panel.

When the optical disk 100 is played back, signals are input to the RF-signal generating circuit 94 from the sample-and-hold circuit 74 in the photodetector integrated circuit 7 and the sample-and-hold circuit 84 in the front-monitor photodetector integrated circuit 8. The RF-signal generating circuit 94 in the RF-signal-processing integrated circuit 9 equalizes frequencies of the input signals, adjusts levels of the input signals to generate the RF signals, and outputs them to the digitizing circuit 102 in the digital signal processor 10. The digitizing circuit 102 binarizes the RF signals into read data and outputs the read data to the decoder 103. The decoder 103 decodes the read data into user data and outputs the user data to the controller 11. Simultaneously, the servo-signal generating circuit 93, the servo circuit 101, and the like, operate in the same way as in the disk-writing operation. The APC 95 controls the laser-emission power level of the laser diode 5, based on the signals input from the sample-and-hold circuit 84, so that the laser-emission power level is a predetermined value.

According to the first embodiment, the photodetector integrated circuit 7 samples and holds the main signals, and the front-monitor photodetector integrated circuit 8 samples and holds the power monitor signals. The held signals are transmitted to the RF-signal-processing integrated circuit 9 at the next stage through the flexible cables. The flexible cables are not driven during sampling of the signals. Accordingly, the settling time when a write laser power changes to a bias laser power during sampling of the signals in the photodetector integrated circuit 7 and the front-monitor photodetector integrated circuit 8 can be sufficiently shortened by enhancing the slew rate during sampling of the signals. Even when the recording speed is increased, precise sampling can be achieved, and stable and precise held signals can be transmitted to the RF-signal-processing integrated circuit 9. Thus, various kinds of signal processing in the RF-signal-processing integrated circuit 9 can be stably and precisely carried out, and data is smoothly written even at a high recording speed.

To address the pulse-train write technique for writing data on a rewritable medium, the signals for a write period are sampled and averaged, and the averaged signal is held in the sample-and-hold circuit 73 of the photodetector integrated circuit 7 and the sample-and-hold circuit 83 of the front-monitor photodetector integrated circuit 8. Then, the held signal is transmitted to the RF-signal-processing integrated circuit 9 through the flexible cables. Accordingly, the sampling timing for the write period does not shift even when the recording speed increases. Thus, various kinds of control, for example, the laser power control of the laser diode 5 and the tracking control of the optical pickup are stably and precisely carried out, and data is smoothly written on a rewritable medium.

Figure 3:
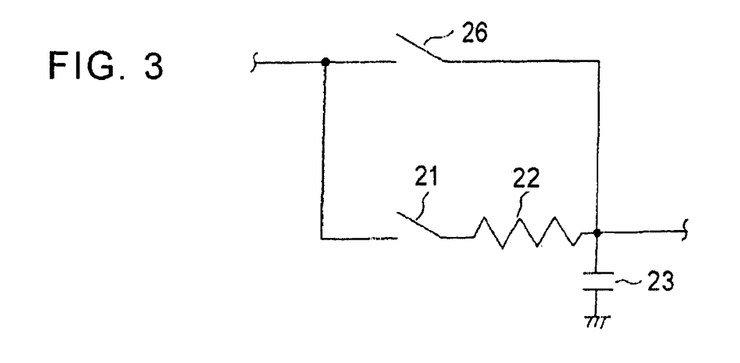
FIG. 3 is a circuit diagram illustrating another structure of each of the sample-and-hold circuits for a write mode shown in FIG. 1.

When data is written on a recordable medium, the pulse-train write technique is not used. Preferably, the tail end of pulses is correctly sampled to obtain correct OPC signals when the power monitor signals are sampled for the write period. Averaging the power monitor signals, as described above, is not required. Thus, each of the sample-and-hold circuit 73 in the photodetector integrated circuit 7 and the sample-and-hold circuit 83 in the front-monitor photodetector integrated circuit 8 is structured as shown in FIG. 3. When data is written on a rewritable medium, a switch 26 is turned off and a switch 21 is turned on so that each of the sample-and-hold circuits functions in the same way as the circuit shown in FIG. 2A. When data is written on a recordable medium, the switch 26 is turned on and the switch 21 is turned off so that each of the sample-and-hold circuits functions in the same way as ordinary sample-and-hold circuits. In such a circuit structure, the power monitor signals are sampled without being averaged. The write-strategy timing-generating circuit 104 controls the above on-off operations of the switches 21 and 26.

Second Embodiment

Figure 5:
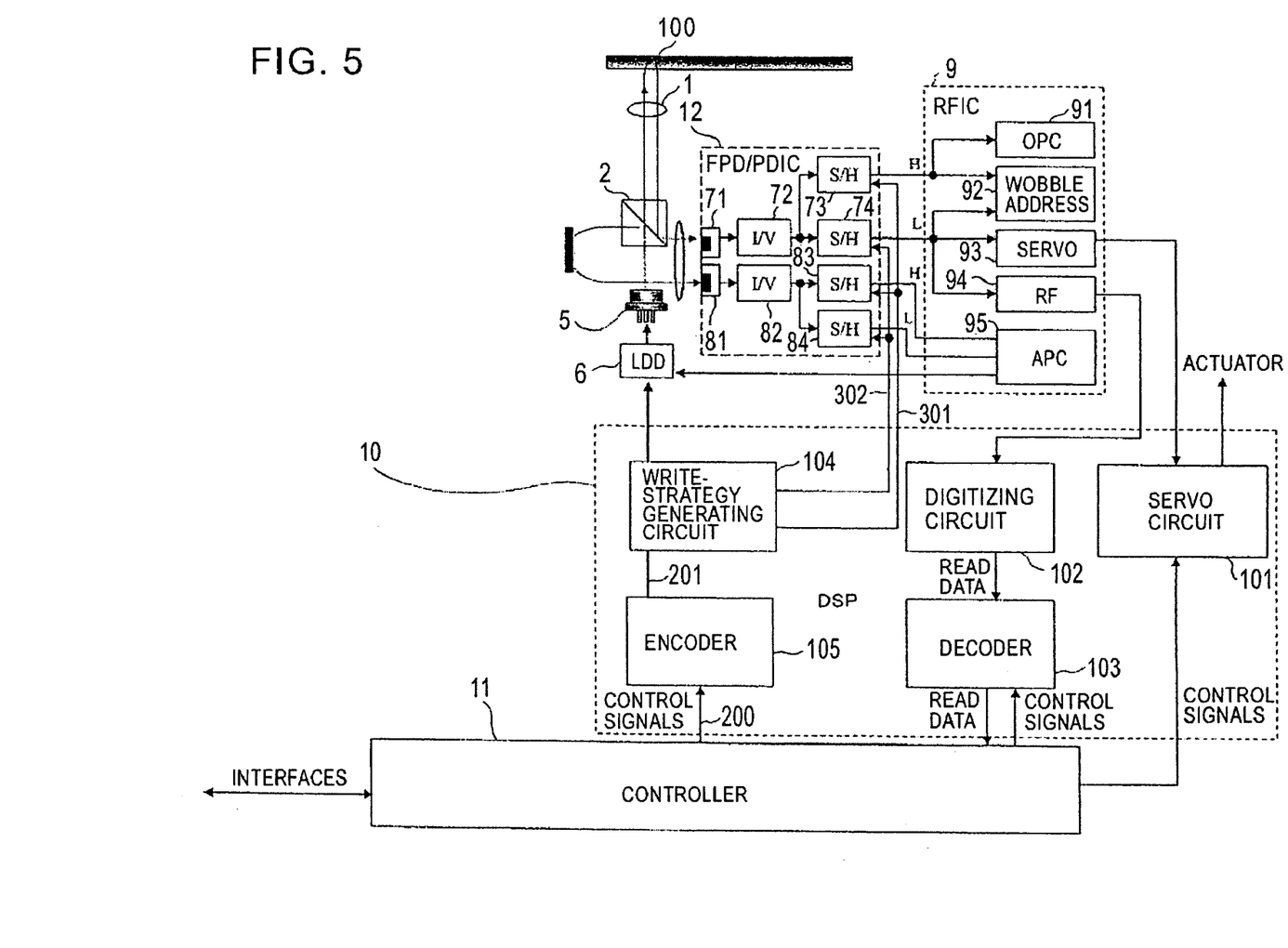
FIG. 5 is a block diagram illustrating the structure of an optical disk apparatus according to a second embodiment of the present invention.

FIG. 5 is a block diagram illustrating the structure of an optical disk apparatus according to a second embodiment of the present invention. The same reference numerals as used in the drawings of the first embodiment are used for elements corresponding to those shown in the drawings of the first embodiment, and the description regarding such elements is omitted.

The optical disk apparatus of the second embodiment is different from that of the first embodiment shown in FIG. 1 in that the optical disk apparatus includes a front-monitor photodetector/photodetector integrated circuit 12 which is a single integrated circuit integrating the photodetector integrated circuit 7 and the front-monitor photodetector integrated circuit 8 in FIG. 1. The same advantages as in the first embodiment can be achieved for the elements corresponding to those in the first embodiment. In addition to those advantages, the space and the power consumption of the circuits are saved by integrating the photodetector integrated circuit 7 and the front-monitor photodetector integrated circuit 8 into a single integrated circuit.

Third Embodiment

Figure 6:
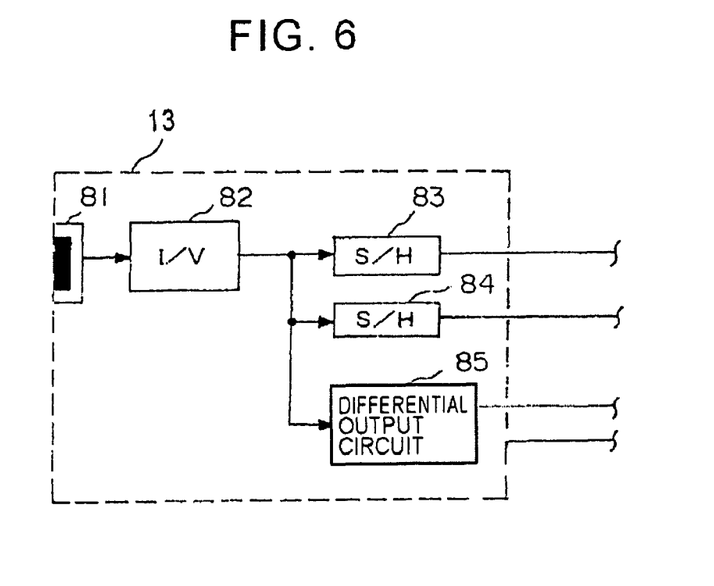
FIG. 6 is a block diagram illustrating the relevant part of an optical disk apparatus according to a third embodiment of the present invention.

FIG. 6 is a block diagram illustrating the relevant part of an optical disk apparatus according to a third embodiment of the present invention. The same reference numerals as used in the drawings of the first embodiment are used for elements corresponding to those shown in the drawings of the first embodiment, and the description regarding such elements is omitted. A front-monitor photodetector integrated circuit 13 in FIG. 6 corresponds to the front-monitor photodetector integrated circuit 8 of the first embodiment shown in FIG. 1. The front-monitor photodetector integrated circuit 13 includes a photodetector (PD) 81, a current-to-voltage converter (I/V) 82, sample-and-hold circuits (S/H) 83 and 84, and a differential output circuit 85 which produces a differential output from output signals from the current-to-voltage converter 82.

The operation in the third embodiment will now be described. When an RF-signal-processing integrated circuit, which is not shown in the drawing, has the same input interfaces for inputting sampled and held signals as the circuit in the first embodiment, outputs of the sample-and-hold circuits 83 and 84 are connected to inputs of the RF-signal-processing integrated circuit with flexible cables, as shown in FIG. 1.

Figure 7:
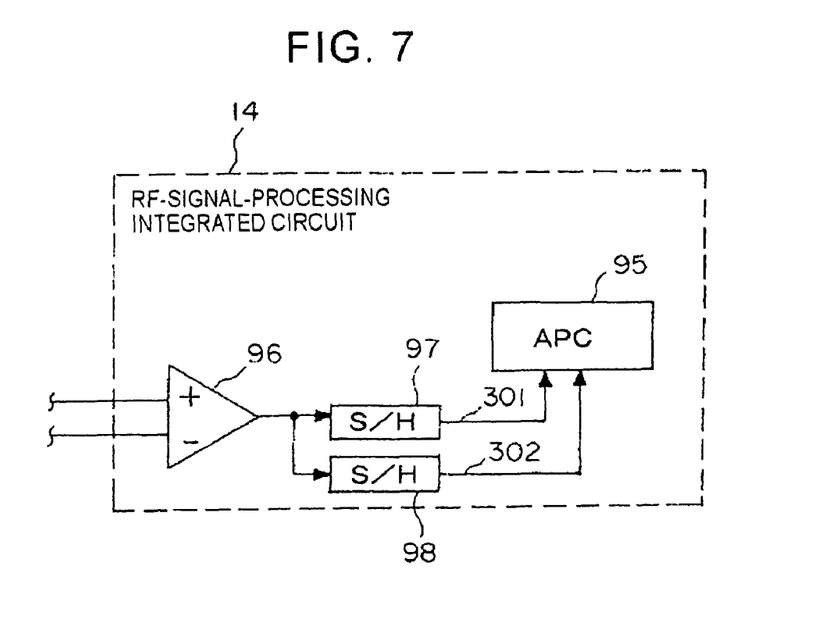
FIG. 7 is a block diagram illustrating an RF-signal-processing integrated circuit according to the third embodiment of the present invention.

FIG. 7 shows an RF-signal-processing integrated circuit 14 which includes a differential amplifier 96, and sample-and-hold circuits (S/H) 97 and 98, but does not includes input interfaces for inputting sampled and held signals. Differential signals are input to and processed by the differential amplifier 96, and the signals processed by the differential amplifier 96 are sampled and held by the sample-and-hold circuits 97 and 98. Outputs of the differential output circuit 85 in the front-monitor photodetector integrated circuit 13 are connected to inputs of the RF-signal-processing integrated circuit 14 with flexible cables. In this case, output signals from the current-to-voltage converter 82 are not sampled and are sent to the RF-signal-processing integrated circuit 14.

According to the third embodiment, the front-monitor photodetector integrated circuit 13 can output sampled and held signals or differential signals depending on interfaces included in the RF-signal-processing integrated circuit 14. Thus, the front-monitor photodetector integrated circuit 13 can be connected to a variety of RF-signal-processing integrated circuits with flexible cables, and has improved versatility.

When a photodetector integrated circuit, which is not shown in the drawing, has the same structure as the front-monitor photodetector integrated circuit 13 so that both sampled and held signals and differential signals may be output from the photodetector integrated circuit, the same advantages as in the front-monitor photodetector integrated circuit 13 can be achieved in the photodetector integrated circuit.

The above-described photodetector integrated circuit and front-monitor photodetector integrated circuit may be integrated into a single chip so that the same advantages as in the second embodiment shown in FIG. 2 can be achieved.

The present invention is not limited to the above embodiments, and is applicable to other embodiments having different structures, functions, operations, and advantages without departing from the spirit of the invention.

What is claimed is:

1. An optical disk apparatus for writing signals on a recording medium by irradiating the recording medium with a laser beam modulated based on the signals, comprising:
    first converting means for Converting a first reflected laser beam component obtained by irradiating the recording medium with the laser beam into electrical signals;
    second converting means for converting a part of a second reflected laser beam component into electrical signals;
    first sample-and-hold means for sampling and holding the electrical signals obtained by the first converting means, the first sample-and-hold means comprising:
        a first sample-and-hold circuit for a write mode for sampling and averaging the electrical signals, and for holding the averaged signal while the laser beam is emitted at a write laser power, and
        a second sample-and-hold circuit for a bias mode for sampling and holding the electrical signals while the laser beam is emitted at a bias laser power;
    second sample-and-hold means for sampling and holding the electrical signals obtained by the second converting means, the second sample-and-hold means comprising:
        a third sample-and-hold circuit for the write mode for sampling and averaging the electrical signals, and for holding the averaged signal while the laser beam is emitted at the write laser power, and
        a fourth sample-and-hold circuit for the bias mode for sampling and holding the electrical signals while the laser beam is emitted at the bias laser power; and
    transmitting means for transmitting the held signals obtained by the first and the second sample-and-hold means to signal-processing means at the next stage.

2. The optical disk apparatus according to claim 1, wherein the transmitting means include flexible cables.

3. The optical disk apparatus according to claim 1, wherein the third sample and hold circuit includes an integration circuit that is formed of a resistor and capacitor.

4. An optical disk apparatus for writing signals on a recording medium by irradiating the recording medium with a laser beam modulated based on the signals, comprising:

first converting means for converting a first reflected laser beam component obtained by irradiating the recording medium with the laser beam into electrical signals;

second converting means for converting a part of a second reflected laser beam component into electrical signals;

first sample-and-hold means for sampling and holding the electrical signals obtained by the first converting means, wherein the first sample-and-hold means comprises:

a first sample-and-hold circuit for sampling and holding the electrical signals while the laser beam is emitted at a write laser power; and a second sample-and-hold circuit for sampling and holding the electrical signals while the laser beam is emitted at a bias laser power;

second sample-and-hold means for sampling and holding the electrical signals obtained by the second converting means, wherein the second sample-and-hold means comprises:

a third sample-and-hold circuit for sampling and holding the electrical signals while the laser beam is emitted at the write laser power;

a fourth sample-and-hold circuit for sampling and holding the electrical signals while the laser beam is emitted at the bias laser power; and transmitting means for transmitting the held signals obtained by the first and the second sample-and-hold means to signal-processing means at the next stage.

5. The optical disk apparatus according to claim 4, wherein the first sample-and-hold circuit samples and averages the electrical signals, and holds the averaged signal while the laser beam is emitted at the write laser power.

6. The optical disk apparatus according to claim 4, wherein the first sample-and-hold circuit averages or does not average the electrical signals subjected to sampling while the laser beam is emitted at the write laser power, depending on the type of recording medium subjected to writing.

7. The optical disk apparatus according to claim 4, wherein the third sample-and-hold circuit samples and averages the electrical signals, and holds the averaged signal while the laser beam is emitted at the write laser power.

8. The optical disk apparatus according to claim 4, wherein the third sample-and-hold circuit averages or does not average the electrical signals subjected to sampling while the laser beam is emitted at the write laser power, depending on the type of recording medium subjected to writing.

9. The optical disk apparatus according to claim 4, wherein the first converting means comprises a first photoelectric conversion element and a first current-to-voltage converter; and the second converting means comprises a second photoelectric conversion element and a second current-to-voltage converter.

10. The optical disk apparatus according to claim 2, wherein the first and the second converting means and the first and the second sample-and-hold means are integrated into a single integrated circuit.

11. The optical disk apparatus according to claim 4, wherein the third sample and hold circuit includes an integration circuit that is formed of a resistor and capacitor.

* * * * *